No. 876,714. PATENTED JAN. 14, 1908.
M. J. HARKINS, M. J. RICKARD & P. J. COWLEY.
RADIATOR MOUNTING AND CONNECTION.
APPLICATION FILED JULY 24, 1906.
3 SHEETS—SHEET 1.
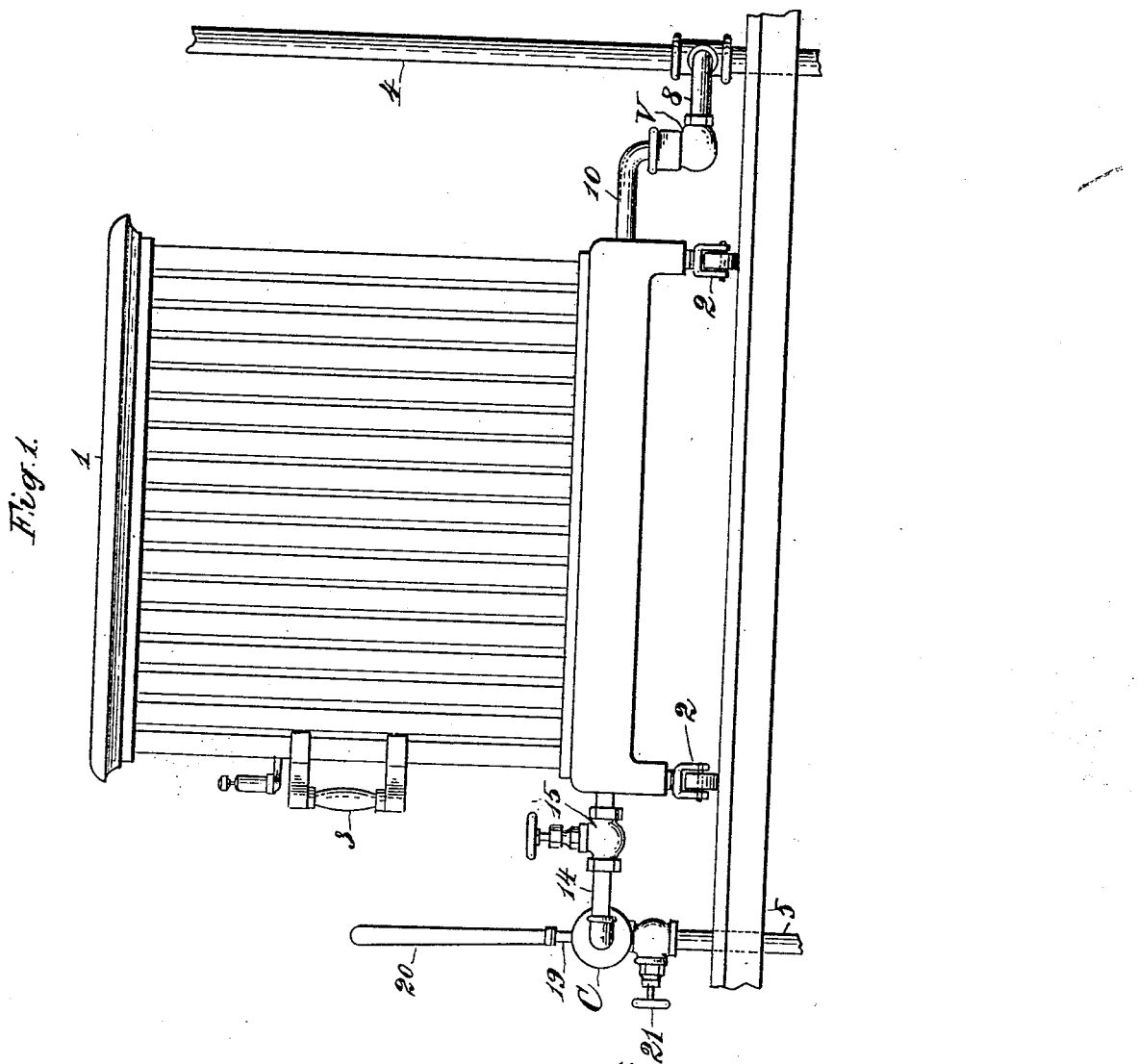

No. 876,714. PATENTED JAN. 14, 1908.
M. J. HARKINS, M. J. RICKARD & P. J. COWLEY.
RADIATOR MOUNTING AND CONNECTION.
APPLICATION FILED JULY 24, 1906.
3 SHEETS—SHEET 2.
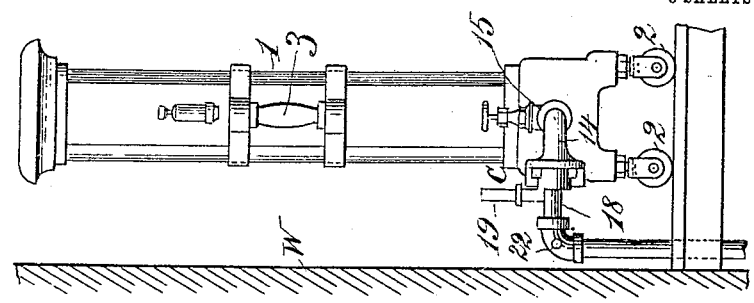
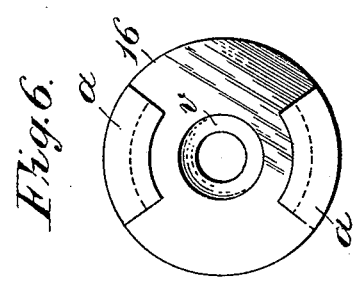
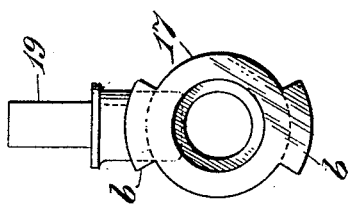
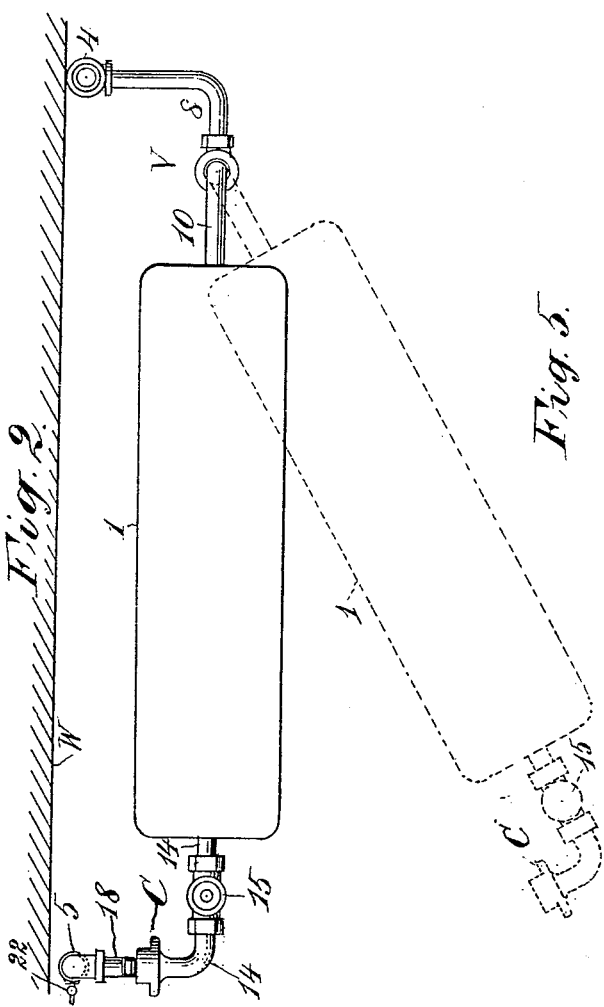
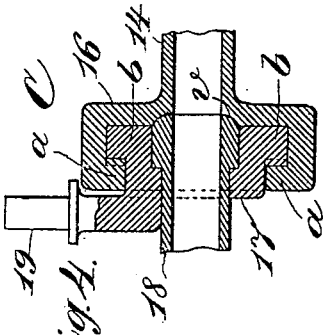
Michael J. Harkins
Michael J. Rickard
Patrick J. Cowley
Inventors
Witnesses No. 876,714. PATENTED JAN. 14, 1908.
M. J. HARKINS, M. J. RICKARD & P. J. COWLEY.
RADIATOR MOUNTING AND CONNECTION.
APPLICATION FILED JULY 24, 1906.
3 SHEETS—SHEET 3.
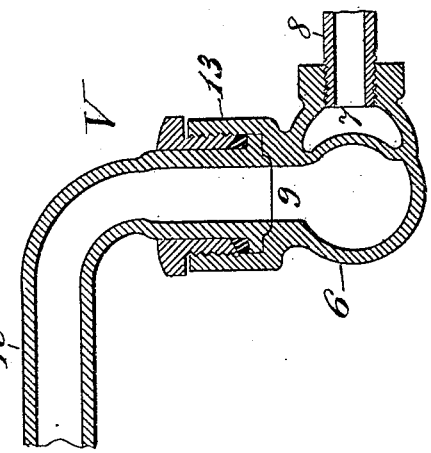
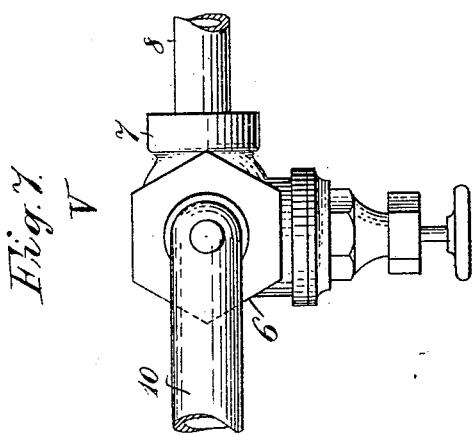
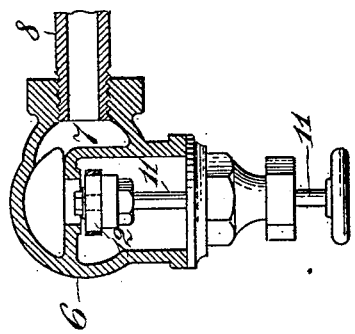

UNITED STATES PATENT OFFICE.

MICHAEL J. HARKINS, MICHAEL J. RICKARD, AND PATRICK J. COWLEY, OF NEW YORK, N. Y.

RADIATOR MOUNTING AND CONNECTION.

No. 876,714.           Specification of Letters Patent.           Patented Jan. 14, 1908.

Application filed July 24, 1906. Serial No. 327,590.

*To all whom it may concern:*

Be it known that we, MICHAEL J. HARKINS, MICHAEL J. RICKARD, and PATRICK J. COWLEY, citizens of the United States, residing, respectively, in the borough of Brooklyn, county of Kings, city and State of New York, in the city, county, and State of New York, and in the borough of the Bronx, city, county, and State of New York, have jointly invented certain new and useful Improvements in Radiator Mountings and Connections, of which the following is a specification.

This invention relates to steam and hot water radiators for warming rooms, and which have facilities for swinging out the radiator from the wall about a hinging axis so that the space behind it may be cleaned; and it has for its object to adapt to this purpose a radiator coupled at one side to a supply pipe for the heating medium and at the other side to a return-pipe for such medium. This mode of mounting is the common one for house-radiators and the present invention adapts them for swinging out from the wall to afford access to the space behind them as will be hereinafter explained. The preferred manner of effecting this end will be hereinafter described with reference to the accompanying drawings which illustrate an embodiment of the invention.

In said drawings:—Figure 1 is a front elevation of an ordinary radiator provided with mountings and connections in accordance with this invention; Fig. 2 is a plan of the same the handle being omitted, and Fig. 3 is an end view of the left-hand end of the radiator with its detachable coupling. The remaining views are details drawn to a larger scale. Figs. 4, 5 and 6 are detail views of the detachable coupling members. Fig. 4 is an axial section; Fig. 5 a face view of the pipe-member of the clutch, and Fig. 6 a face view of the radiator member thereof. Figs. 7, 8 and 9 are detail views of the device V. Fig. 7 is a plan view; Fig. 8 is a horizontal, axial section, and Fig. 9 is a vertical section showing the stuffing-box.

1 designates the radiator as a whole. It may be of any size or pattern. It will be provided by preference, with rollers 2 and a handle 3 for convenience in shifting it. The steam or hot water will be supplied from a pipe 4, seen at the right in Figs. 1 and 2, and will discharge into a return-pipe 5, seen at the left in these figures. The supply pipe 4 communicates with the radiator through a connection now to be described. This connection is in the nature of a specially constructed device, V, (Figs. 7 to 9) of which 6 is the casing, provided with an inlet 7, where it is connected by a branch-pipe 8 with the supply pipe 4, and an outlet 9, connected by a pipe 10 with the radiator. The valve-stem 11 and valve 12 may be of the usual kind. At the outlet 9, the axis of which is upright, there is a stuffing-box 13 to receive the upright extremity of the pipe 10, and in swinging the radiator away from or toward the wall, this upright part of the pipe 10 turns in the stuffing-box, as a journal in its bearing, this pipe forming the axis about which the radiator moves or swings. At the other side there is a detachable connection C between the radiator and the return-pipe 5, and this connection and coupling will now be described with especial reference to Figs. 4, 5 and 6.

The pipe 14 from the radiator has in it a cut-off cock or valve 15, of a known construction, and bears on its outer end one member, 16, of an interlocking coupling. Preferably the pipe 14 will be bent or curved horizontally so that the member 16 will face toward the wall (W in Fig. 2). The other member, 17, of the coupling is rotatable on a pipe 18 and has a stem 19, to receive a detachable socket-lever 20 (seen in Fig. 1), for rotating the member 17. The pipe 18 connects at its other end with the pipe 5, and has in it a stop-cock or valve 21, and faucet or cock 22. The end *v* of the pipe 18 which is at the coupling seats like a valve when the coupling is effected. The coupling itself is constructed as follows:—On the member 16 are two overhanging or L-shaped lugs *a*, and on the member 17 are two radial lugs *b*. When the members are brought together and the member 17 rotated, the lugs *b* engage the lugs *a*, and as the bearing faces of the pairs of lugs are slightly beveled, this rotation has the effect to draw the parts together and cause the valve-like extremity *v* of the pipe 18 to seat itself firmly and prevent leakage.

The device is operated as follows: See that the cocks or stop-valves are all closed. The faucet or cock 22 may be opened to assure that the cocks 15 and 21 are closed. Now apply the socket-lever 20 to the stem 19 and rotate the coupling member 17 so as to uncouple the radiator and the latter may then be swung out, turning at the stuffing box 13.

The dotted lines in Fig. 2 show the radiator after having been moved or swung out from the wall. After cleaning out the space behind it, the radiator may be again swung back into place, the coupling effected, and the cocks again opened.

Obviously the invention is not restricted to all of the details of construction precisely as herein shown as these may be substituted by equivalent devices, capable of accomplishing the same end. By detachable, as this term is applied to the coupling C, is meant a coupling having means whereby the user, or any person, may readily detach that side of the radiator from the pipe without the necessity of calling in a plumber or steam-fitter.

The handle 3 is not essential or even important to this radiator, and it may be omitted. It has not been shown in Fig. 2 as it would obscure the parts below it.

As the pipes 4 and 5 in ordinary heating systems are set at a considerable distance apart, with the radiator between them and coupled thereto at its respective lateral sides or edges, it follows that the radiator must be detached at one of said sides or edges so as to open like a gate before it can be swung away from the wall.

Having thus described our invention, we claim—

1. The combination with supply and return pipes for a heating fluid, an upright radiator disposed between said pipes, a pivotal coupling device which couples said radiator at one side to one of said pipes the pivotal axis of the coupling being upright, a readily detachable coupling which connects the radiator at its other side with the other pipe for the fluid, said coupling having a horizontal axis and comprising a fixed and a rotative member, one on the radiator and the other on the fluid-carrying pipe, said coupling members being so disposed as to engage for interlocking when the radiator is moved into place about its pivotal connection at the other side.

2. The combination with supply and return pipes, and a radiator between the same, of a coupling device V between the supply pipe and the radiator, said device having a stuffing-box with an upright axis and connected on one side with the supply pipe, a pipe 10, one end of which is secured to and in communication with the radiator and the other end having a rotatable bearing in the said stuffing-box, and a detachable, interlocking coupling between the radiator and the discharge pipe.

3. The combination with supply and return pipes, and a radiator provided with rolling supports disposed between said pipes, of a pivotal coupling with an upright axis between the radiator and the supply pipe, and a detachable interlocking coupling between the radiator and the return pipe, said coupling comprising the member 16, carried by the radiator, the fixed discharge pipe 18, and a member 17, rotatively mounted on the pipe 18 and adapted to engage the member 16.

In witness whereof we have hereunto signed our names this 23rd day of July 1906, in the presence of two subscribing witnesses.

MICHAEL J. HARKINS.
MICHAEL J. RICKARD.
PATRICK J. COWLEY.

Witnesses:
H. G. Hose,
William J. Firth.